June 3, 1958 V. C. LYNCH 2,836,921
FISHING-ROD REEL
Filed Nov. 23, 1956 2 Sheets-Sheet 1
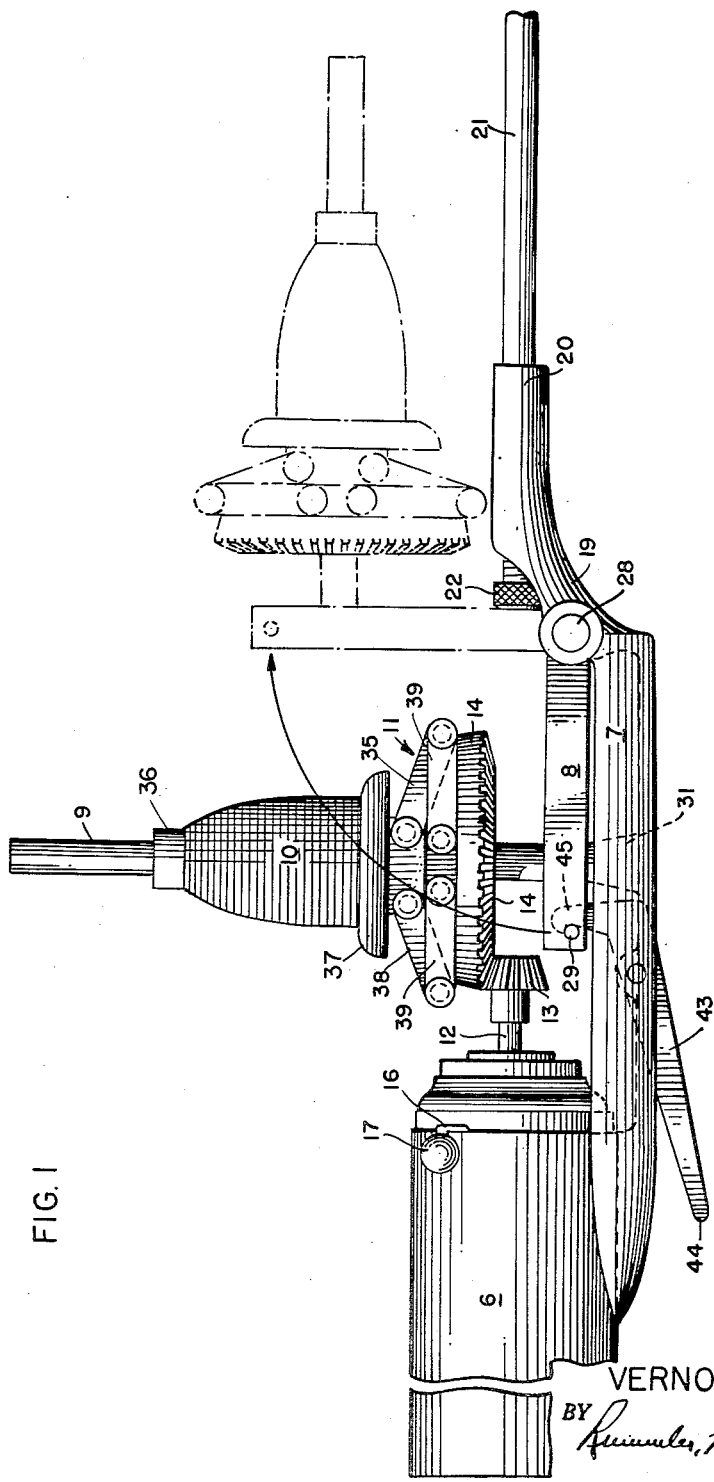
FIG. I
INVENTOR:
VERNON C. LYNCH
BY
ATT'YS June 3, 1958 — V. C. LYNCH — 2,836,921
FISHING-ROD REEL
Filed Nov. 23, 1956 — 2 Sheets-Sheet 2
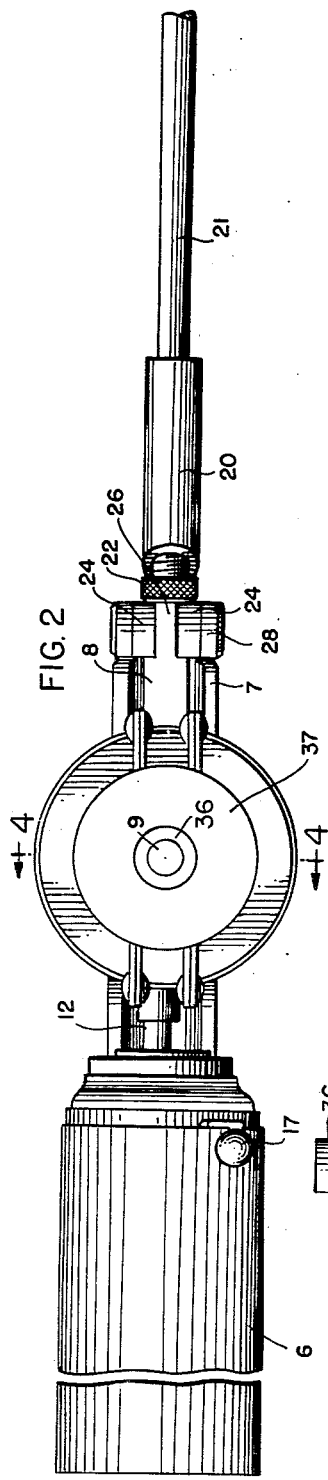
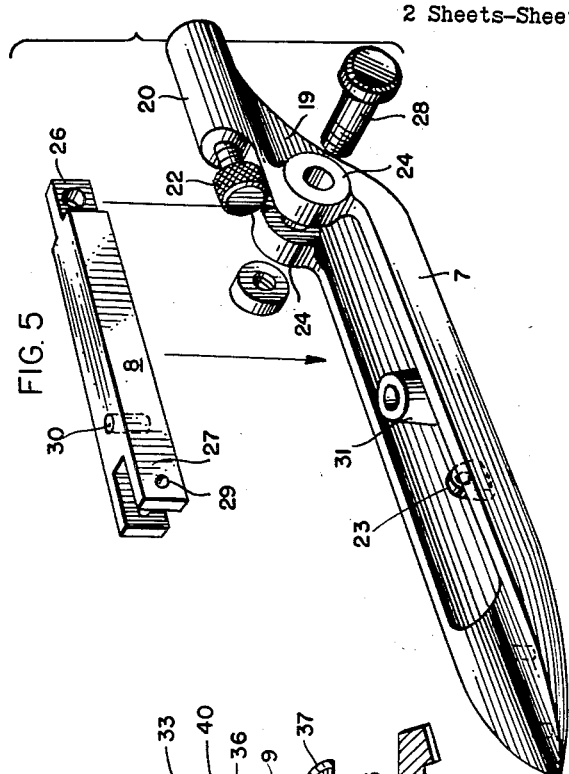
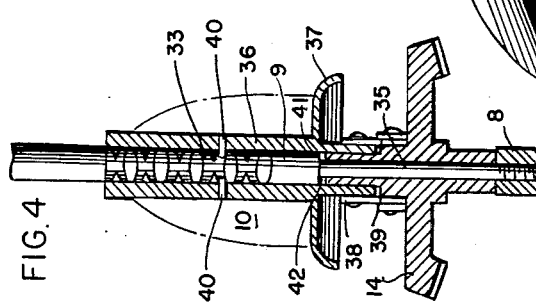
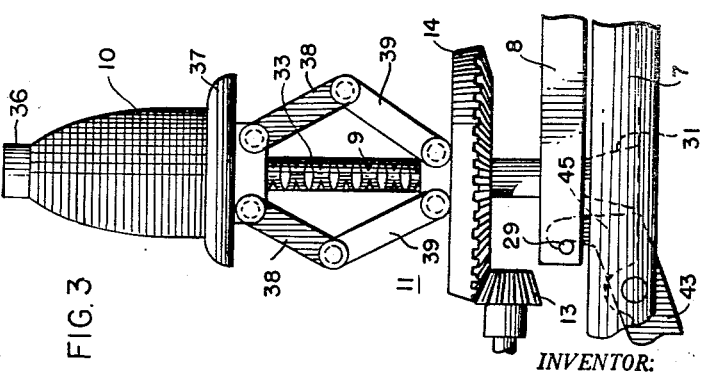
INVENTOR:
VERNON C. LYNCH
BY
ATT'YS

United States Patent Office 2,836,921
Patented June 3, 1958

2,836,921

FISHING-ROD REEL

Vernon C. Lynch, Waukesha, Wis.

Application November 23, 1956, Serial No. 623,986

7 Claims. (Cl. 43—21)

This invention relates to power operated fishing-rod reels and particularly to improvements in the reel winding and mounting mechanism. Specifically this invention is an improvement on the disclosure of my copending application, Serial No. 397,164 filed Dec. 29, 1953, now Pat. No. 2,776,515.

The main objects of this invention are to provide an improved form of power operated fishing-rod reel-spool; to provide a fishing rod having improved means for effecting the axial reciprocation of the reel-spool during the reeling in of the line; to provide an improved mounting of a reciprocable-rotatable reel-spool which permits its shifting between an axial position transverse to the rod for reeling in the line and an axial position parallel to the rod for letting out the line; to provide an improved means for releasably latching the reel-spool in its reeling-in position on the rod; to provide an improved reel winding mechanism for spin-casting reels; and to provide an improved power operated fishing-rod reel-spool of this kind which is simple in construction and therefore economical to manufacture and efficient in use.

In the adaptation of the invention shown in the accompanying drawings;

Figure 1 is a side view of the handle portion of a fishing rod mounting an improved power-driven, reciprocable reel-spool mechanism constructed in accordance with this invention;

Fig. 2 is a plan view of the same;

Fig. 3 is a fragmentary view of the reel-spool in an opposite extreme position from that shown in Fig. 1;

Fig. 4 is a longitudinal, sectional view of the same, partly broken away, taken on the plane of the line 4—4 of Fig. 2; and Fig. 5 is an exploded perspective of the bracket and mounting arm whereby this improved reel-spool and a rod are secured to the supporting handle.

The essential concept of this invention involves a reel-spool journaled on a mounting arm with a reverse screw-thread-follower interconnection with a fixed shaft and so geared to a power drive in the supporting handle that the reel-spool rotation effects its axial reciprocation during the reeling in of the line, the mounting arm being hinged on the supporting handle for swinging between a power-driven reeling-in position with the reel-spool axis normal to the handle axis and an unreeling or spin casting position with the reel-spool axis parallel to the handle axis.

A fishing rod embodying the foregoing concept comprises a handle 6 to which is secured a reel mounting saddle or bracket 7 whereon is hinged an arm 8 to which is affixed a shaft 9 rotatively and reciprocatively journaling a reel-spool 10 driven by a gear-and-toggle means 11.

The handle 6 may be made of any suitable material permitting it to be hollow so as to accommodate therein a suitable motor means, such as a conventional fractional horse-power electric motor (not shown), and at the same time afford a convenient grip for one using the fishing rod in any of the angling sports such as casting, spin fishing, trolling, and even still fishing when that is indicated.

A drive shaft 12 extending from the handle-housed motor means mounts a pinion 13, exteriorly of the handle 6, to mesh with a gear 14 of the gear-and-toggle means 11, hereinafter to be described more fully. Adjacent the forward end of the handle 6 is positioned a switch lever 16 for controlling the handle-housed motor. A knob 17, on the outer end of the switch lever 16, is located so as to be easily contacted by the thumb of a hand grasping the handle 6 to shift the switch lever 16 to turn the handle-housed motor on and off.

Although not here shown, the rear end of the handle 6 would have a suitable means for imparting energy to the motor contained within the handle, for example an electric cord leading to a battery carried in the fisherman's pocket when an electric motor is used.

The reel supporting saddle 7 comprises an extension of the handle 6 which is laterally offset from the handle axis and which terminates at 19 in socket formation 20, substantially aligned with the handle axis and opening outwardly to receive the inner end of a rod 21. As shown, a knurled-headed adjusting screw 22 is threaded into the inner end of the socket formation 20 to limit the forward and upward swing of the reel-spool mounting arm 8 which is hingedly pivoted between suitable ear formations 24 on the saddle 7.

The reel-spool mounting arm 8 here is shown in the form of a bar having an apertured tongue 26 at one end and an apertured bifurcation 27 at the other end. The arm 8 is hinged to the saddle 7 by having the tongue 26 seated between the ears 24 and secured thereto by a suitable pin fastening 28. The bifurcated end 27 mounts a cross pin 29, the purpose of which will be explained presently.

The reel supporting shaft 9 is non-rotatively secured to the arm 8 by any suitable means, such as threading the shaft into an opening 30. The upper portion of the shaft 9 has a reverse helical-thread formation 33 (Fig. 4) of a character similar to the conventional reciprocating press drill, screw driver, and the like. A boss 31, projecting from the saddle 7, serves as an abutment means acting against the bottom of the arm 8 to dispose the arm 8 parallel to the saddle, and insure a secure latching of the arm 8 in that line reeling-in position.

The reel-spool 10, as shown, is of an open ended form with a hub 36 and a bottom end plate 37, the sleeve comprising the hub 36 being of sufficient length to cover the threads 33 in the shaft 9 when the spool is in its lowermost position. The reel-spool 10 is connected to the gear 14 by pairs of pivotedly connected toggle links 38 and 39 which permit a relative axial reciprocation of the reel-spool 10 relative to the gear 14 during their rotation about the shaft 9. Follower pins 40, in the reel hub 36 extend into the screw-thread formation 33 to effect the reciprocation of the reel-spool 10 on the shaft 9 as the reel-spool is rotated by the gear 14 through the toggle links 38 and 39 which have their inner ends pivotedly connected to suitable formations on the reel and gear respectively.

The gear 14 is rotatably mounted on a reduced portion 35 of the shaft 9, below the portion supporting the reel 10, in position to mesh with the pinion 13 when the arm 8 is in its retracted position parallel to the bracket 7, upward movement of the gear being prevented by the shoulder 41 and a washer 42 between the shoulder and the gear hub.

A latch 43 is pivotedly mounted in a suitable slot in the saddle 7, adjacent to the handle 6, and has a trigger end 44 projecting through the slot below the handle in convenient position to be operated by the user's forefinger. The opposite end of the latch is provided with a hook formation 45 adapted and positioned to engage the pin 29 on the bifurcated end 27 of the arm 8, to positively hold the gear 14 in mesh with the pinion 13 when the reel is in the vertical driven position shown in solid lines in Fig. 1. Releasing the latch 43 permits the reel to be thrown forward to the spin casting position, shown in dotted lines in Fig. 1, and in this position the arm 8 is engaged by the adjustable screw 22 threaded axially into the rearward end of the socket formation 20 of the saddle 7, whereby adjustment of the casting position of the reel relative to the rod axis may be had.

This improved fishing rod is used in the following manner:

Power for the motor means in the handle 6 is first supplied, either by connection with a cord leading from a battery, when the power means is an electric motor, or by tensioning or winding a spring if the motor means is mechanical. Then, with the line wound on the reel, the apparatus is ready for use.

When casting, the tip of the rod is swung in a substantially vertical arc to throw the bait or lure outwardly and forwardly in the usual manner and when the rod is pointed to the desired direction the latch 43 is released by the forefinger of the casting hand pressing upon the trigger portion 44 thereby releasing the arm 8 so that the inertia of the reel 10 will cause the reel to be thrown to the forward horizontal position shown in dotted outline in Fig. 1, from which the line is free to spin off from the open forward end of the reel without the necessity of turning the reel. The open forward end of the reel, contrary to the usual reel constructions with end plates at both ends, permits the line to spin-off from the reel without interference and completely eliminates any whip or back-lash of the line, which is so troublesome with the ordinary spin casting reels. The bottom plate 37 keeps the line clear of the toggle 11 during the winding operation. When the bait or lure has hit the water, a backward snap of the rod in the caster's hand will cause the reel 10 to swing backwardly to vertical position where the arm 8 is engaged by the hook 45 of the latch and held with the gear 14 in meshing engagement with the motor pinion 13. Then by manipulation of the switch 16 the motor can be operated to drive the reel in winding direction or to coast in the unwinding direction, so as to pay out line, as the operator may desire.

When rotated to wind, the reel 10 will reciprocate up and down on the fixed shaft 9, due to engagement of the pins 40 in the thread channels 33, thereby causing an automatic distribution of the line axially of the reel body. This reel action causes the line to accumulate on the reel in a more or less conical fashion with the bulk of the line at the base or bottom end of the reel so that when the line is spinning off the reel, as in casting, it will have a minimum of impedance from the winding convolutions on the reel. In spin casting this is a very important advantage.

In the winding position the reel 10 is always in direct driving connection with the handle mounted motor means so that take up of the line is instantly controlled, whether it be to take up slack, to retrieve the lure, or reel in a fish. The reel drive may be instantly started or stopped at any time, as when playing a hooked fish, and when the fish is running the motor connection, together with the reciprocating action of the reel, provides an automatic drag. In the casting position the reel normally does not rotate. Rather the line merely spins out over the open end of the reel, each coil of the reeled line straightening as it leaves the reel, so that a maximum of free running of the line is obtained.

The shifting of the reel between its reeling and casting positions is accomplished solely by the wrist action of the caster and the manipulation of the latch trigger 44, thus one handed operation for both reeling in and casting is had, the reeling in operation being under the complete control of the caster by thumb manipulation of the switch 16.

Although but one specific embodiment of this invention is herein shown and described it will be understood that numerous details of the construction shown may be altered or omitted without departing from the spirit of the invention as defined by the following claims.

I claim:

1. A fishing rod comprising, a supporting handle, a motor housed in the handle and having a shaft projecting forwardly therefrom, a reel mounting extension on the handle, a pinion on the motor shaft exteriorly of the handle, an arm hinged to said extension, a reel-spool shaft fixed on the arm and swingable with the arm between positions with the reel-spool shaft axis normal to and parallel with the axis of the motor shaft, a gear journaled on the reel-spool shaft in position to mesh with the pinion when the reel-spool shaft axis is normal to the motor shaft, a reel-spool journaled on the reel-spool shaft and connected to rotate with the gear, and coacting means on the reel-spool shaft and the reel-spool for effecting the axial reciprocation of the reel-spool when rotated on the reel-spool shaft.

2. A fishing rod comprising, a supporting handle, a motor housed in the handle and having a shaft projecting forwardly therefrom, a pinion on the motor shaft exteriorly of the handle, a reel mounting means secured to the handle, a reel-spool shaft on the mounting means with its axis normal to the motor shaft, a gear journaled on the reel-spool shaft and meshing with the pinion, a reel-spool journaled on the reel-spool shaft, a reverse screw-thread formation on the reel-spool shaft, a follower on the reel-spool engaging the screw-thread formation to effect an axial reciprocation of the reel-spool on its shaft when the reel-spool is rotated, and extensible and retractible means connecting said gear in driving relation with said reel-spool.

3. A fishing rod comprising, a supporting handle, a motor housed in the handle and having a shaft projecting therefrom, a pinion on the motor shaft exteriorly of the handle, an extension on said handle, an arm hinged to said extension, a reel-spool shaft fixed on the arm and swingable with the arm between positions with the reel-spool shaft axis normal to and parallel with the axis of the motor shaft, a gear journaled on the reel-spool shaft in position to mesh with the pinion when the reel-spool shaft axis is normal to the motor shaft, a reel-spool journaled on the reel-spool shaft and connected to rotate with the gear, a reverse screw thread formation on the reel-spool shaft, and a follower on the reel-spool engaging the screw-thread formation to effect an axial reciprocation of the reel-spool on its shaft when the reel-spool is rotated.

4. A fishing rod comprising, a handle, a motor housed in the handle and having a shaft projecting axially forwardly therefrom, a pinion on the motor shaft exteriorly of the handle adjacent the forward end thereof, a mounting bracket fixed on the handle and extending forwardly thereof in spaced parallel relationship with the motor axis, a reel-spool arm hinged to the bracket forwardly of the pinion and swingable between positions parallel with and transverse to the motor shaft, a reel-spool shaft fixed on the arm at right angles thereto, a gear journaled on the reel-spool shaft in position to mesh with the pinion when the arm is disposed parallel to the motor shaft, a reel-spool journaled on the reel-spool shaft outwardly of the gear, and coacting means on the gear, the reel-spool and the shaft for simultaneously rotating and axially reciprocating the reel-spool when the gear is in mesh with the pinion.

5. A fishing rod comprising, a handle, a motor housed in the handle and having a shaft projecting axially forwardly therefrom, a pinion on the motor shaft exteriorly of the handle, a mounting bracket fixed on the handle and extending forwardly thereof in spaced parallel relationship with the motor axis, a reel-spool carrier arm hinged to the bracket forwardly of the pinion and swingable between positions parallel with and transverse to the motor shaft, a reel-spool shaft fixed on the carrier arm at right angles thereto, a gear journaled on the reel-spool shaft in position to mesh with the said pinion when the carrier arm is disposed parallel to the motor shaft, a reel-spool journaled on the reel-spool shaft outwardly of the gear and having a extensible connection with the gear for rotation therewith, a reverse screw formation on the reel-spool shaft, and a follower on the reel-spool engaging the shaft screw formation for effecting the axial reciprocation of the reel-spool relative to the gear when gear is rotated on the reel-spool shaft.

6. A fishing rod comprising, a handle, a motor housed in the handle and having a shaft projecting axially forwardly therefrom, a pinion on the motor shaft exteriorly of the handle, a mounting bracket fixed on the handle and extending forwardly thereof in spaced parallel relationship with the motor axis, a reel-spool carrier arm hinged to the bracket forwardly of the pinion and swingable between positions parallel with and transverse to the motor shaft, a reel-spool shaft fixed on the carrier arm at right angles thereto, a gear journaled on the reel-spool shaft in position to mesh with the pinion when the carrier arm is disposed parallel to the motor shaft, a reel-spool journaled on the reel-spool shaft outwardly of the gear, a toggle driving connection between the gear and reel-spool to permit rotation and relative axial movement of the gear and the reel-spool, a reverse screw-thread formation on the reel-spool shaft, a follower on the reel-spool engaging the shaft screw-thread formation for effecting the axial reciprocation of the reel-spool when rotated on the reel-spool shaft, and a manually-releasable latch means hinged on the bracket for holding the carrier arm with the reel-spool shaft normal to the motor shaft and the gear in mesh with said pinion.

7. A fishing rod comprising, a handle, a mounting bracket fixed on the handle and extending forwardly thereof, said bracket terminating in socket means for mounting a rod in axially parallel relation with said handle, a carrier arm hinged to the mounting bracket adjacent the forward end thereof for swinging movement between a position parallel to the axis of said handle and a position normal to the axis of the handle, a reel-spool shaft fixed on the carrier arm at right angles thereto, a gear journaled on the reel-spool shaft, a reel-spool journaled on the reel-spool shaft outwardly of the gear, a toggle connection between the gear and reel-spool to permit simultaneous rotation and relative axial movement of the gear and the spool, a reverse screw-thread formation on the reel-spool shaft, a follower on the reel-spool engaging the screw-thread formation for effecting the axial reciprocation of the reel-spool when rotated on the shaft, means for driving said gear, and releasable latch means for normally holding said carrier arm in the position parallel with the handle axis.

References Cited in the file of this patent

UNITED STATES PATENTS

| | | |
|---|---|---|
| 2,144,635 | Norton | Jan. 24, 1939 |
| 2,262,637 | Fanshier | Nov. 11, 1941 |
| 2,634,920 | Dunn | Apr. 14, 1953 |
| 2,776,515 | Lynch | Jan. 8, 1957 |